[11] 3,610,889

| | | | |
|---|---|---|---|
| [72] | Inventor | Robert N. Goldman | |
| | | Pacific Palisades, Calif. | |
| [21] | Appl. No. | 558,127 | |
| [22] | Filed | June 16, 1966 | |
| [45] | Patented | Oct. 5, 1971 | |
| [73] | Assignee | Telecredit, Inc. | |

[54] IDENTIFICATION CARD CONTROL SYSTEM
5 Claims, 7 Drawing Figs.

[52] U.S. Cl. .......................................... 235/61.7 B,
340/149 A
[51] Int. Cl. .......................................... G05b 1/00,
G06k 17/00
[50] Field of Search........................................ 235/61.7,
61.7 B; 340/149 A (149); 179/6.3 CC (2 CA);
222/2, 23, 27

[56] References Cited
UNITED STATES PATENTS
2,914,746  11/1959  James................................ 340/149
3,015,087  12/1961  O'Gorman........................... 340/149
3,097,347   7/1963  Simjian............................ 235/61.7 (6)
3,109,924  11/1963  Frederick......................... 235/61.11 (4)
3,146,342   8/1964  Perotto........................... 235/61.11 (4)
3,225,175  12/1965  Hypolainen........................ 235/61.7

*Primary Examiner*—Maynard R. Wilbur
*Assistant Examiner*—Thomas J. Sloyan
*Attorney*—Nilsson, Robbins, Wills & Berliner ABSTRACT: A system is disclosed for use with credit cards which carry a magnetic recording medium and utilizes time or discrete use intervals to regulate the use of a card. A register for indicating a time, e.g., month and day, is associated with structure for providing electrical reference signal indicative of such time. A time is also sensed from the card in the form of electrical subject signals which are compared with the reference signals. The result of the comparison is indicated as a manifestation of the acceptability of the card, and the reference signals are recorded on the card as subject signals.

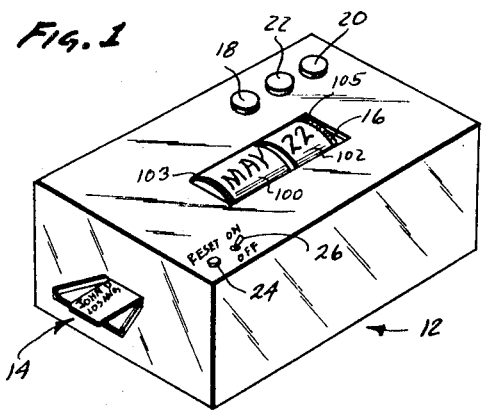
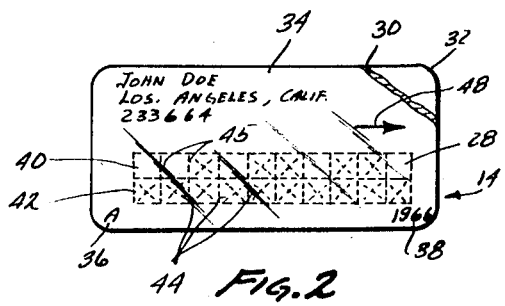
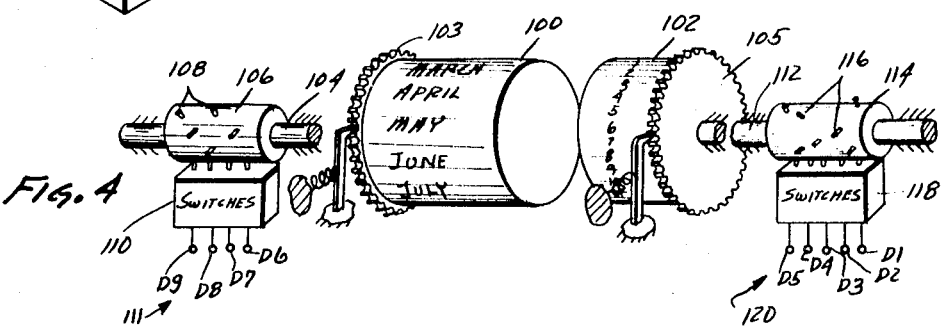
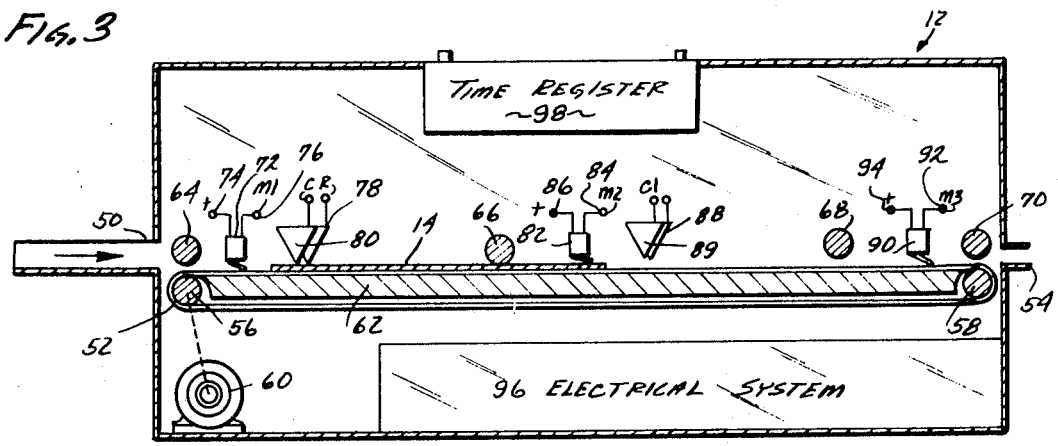
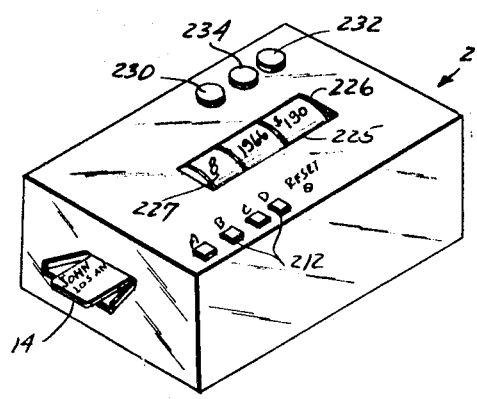
INVENTOR
ROBERT N. GOLDMAN

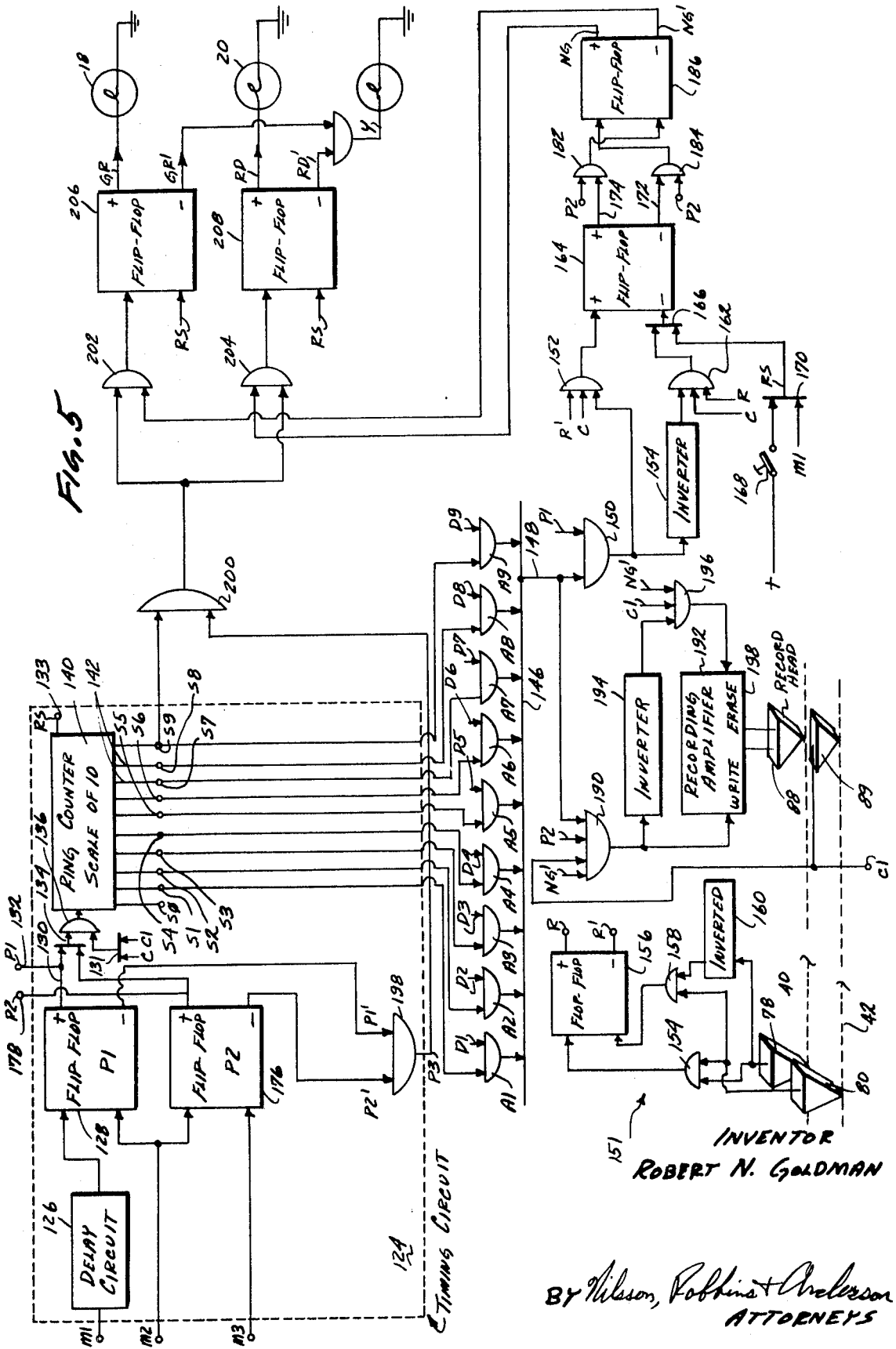

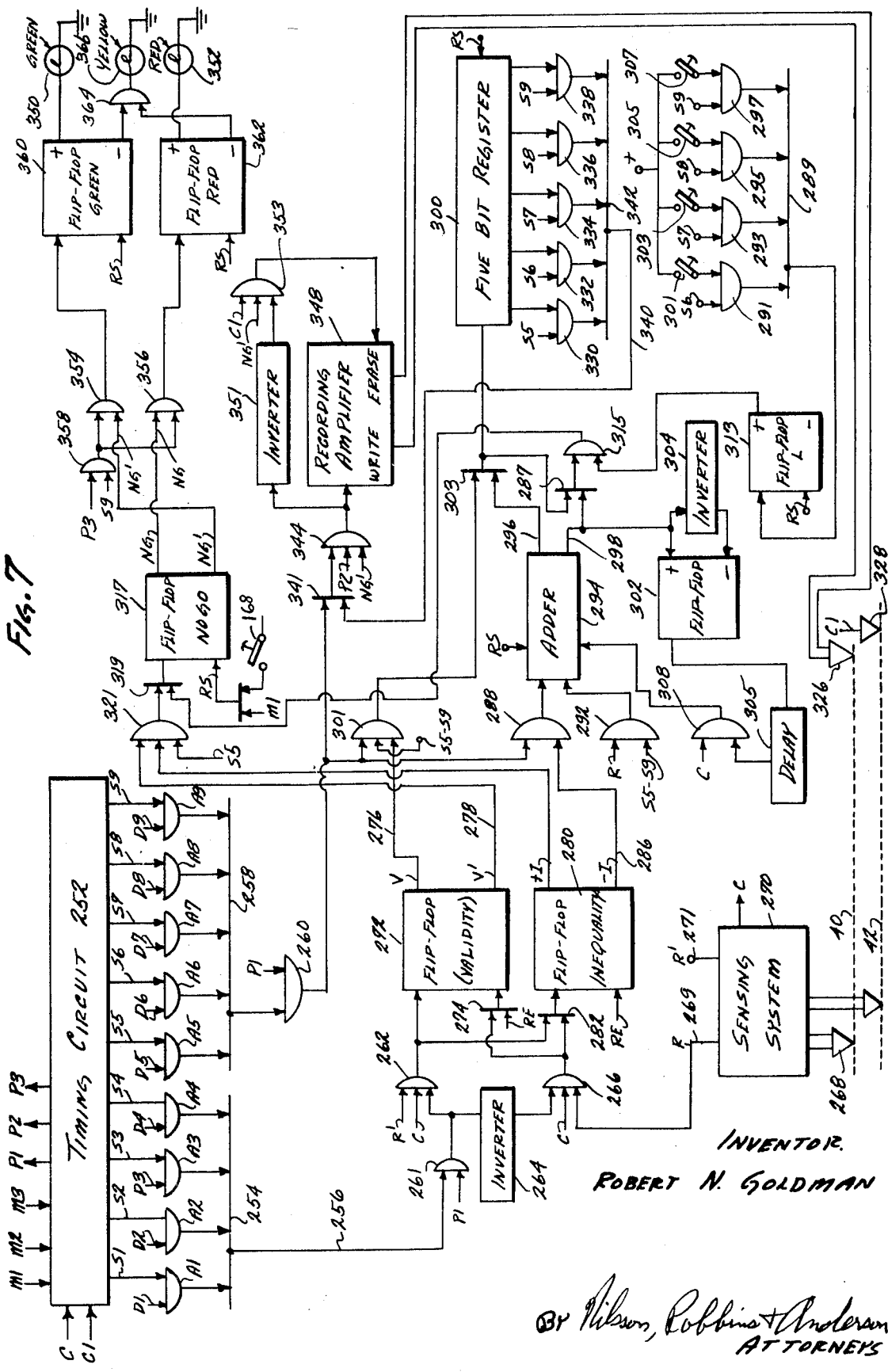

IDENTIFICATION CARD CONTROL SYSTEM

The present invention relates to an identification and control system and more particularly to a system for use in cooperation with an identification card which bears recording medium, which system may be effectively employed to control the use of the identification card as to support authorized credit transactions.

Various forms of identification cards or credit cards have come into exceedingly widespread use to designate the owner as a person to whom credit may be extended. These cards have been successful largely because they enable their owner to avoid carrying significant amounts of cash. However, the use of the cards and similar devices, has not been without certain attendant difficulties. For example, the owner of a credit card may become irresponsible due to financial reverses, whereupon he may incur a large indebtedness based on his credit card, which indebtedness may not be recoverable.

Another problem in the use of cards, plates, and other devices employed to identify a person for credit, stems from the loss of such devices. That is, the owner of a credit card may lose his card or it may be stolen, whereupon an unauthorized bearer may make large purchases supported by the credit card. Generally, in such a situation, either the owner of the credit card or the issuing organization incurs a substantial loss.

In view of these difficulties, some attempts have been made to control the use of credit cards and other forms of identification devices. For example, it has been proposed to utilized a computer which maintains a current balance for each issued credit card. A warning is then provided in the event a credit card is used to excess. However, in general, systems of this type have not come into widespread use for several reasons. First, the requisite computer is inherently expensive, both in acquisition and in maintenance. Second, it is a requirement of the system that upon each presentation of the credit card, communication must be established with the computer. As a result, the usability of the card must be quite restricted or the necessary communication system reaches impractical proportions.

Therefore, considerable need exists for a practical system, for use in cooperation with credit cards and related devices, which system may be effectively employed to control the use of these devices and thereby minimize financial loss, both to the persons to whom the cards are assigned (owners) and to the issuing organization. In this regard, the present invention is based upon the recognition of the significance of time or discrete time intervals as a factor in controlling the use of a credit card. That is, the present invention contemplates control of identification devices based on use of such devices as related to a particular interval of time and has widespread application in conjunction with many different types of devices. It is therefore an object of the present invention to provide an improved system for use with an identification card or device, encompassing identification plates, passes, tickets, credit cards and other devices presented for example in transactions to receive goods or services, which system is economical and effective.

Another object of the present invention is to provide an improved system for use in cooperation with identification cards, which system reveals excessive use of a card, and which system may be extremely extensive without coextensive communication networks.

Another object of the present invention is to provide an improved structure for cooperative use with identification cards which structure may be used in a multiplicity to effectively and cooperatively regulate the use of the identification cards without requisite interconnecting communication links between the structures.

Still another object of the present invention is to provide an improved system for use at points-of-purchase, to manifest the extent of use of an identification card, and thereby minimize losses resulting from excessive use of such a card.

Still a further object of the present invention is to provide an improved system which may be used in large numbers at remote locations for individually manifesting the extent of use of a card at the location of a transaction, whereby to minimize the losses resulting from excessive use of such a card.

One further object of the present invention is to provide an improved system for use in cooperation with an identification card which bears a recording medium thereon, and which system incorporates a register that is set to indicate a predetermined terminal of time, and further includes means for sensing the recording medium on the card to provide an indication of the last time when the card was employed; which system further includes comparison means to manifest the total extent to which the card is being used; and which system may further include means for more precisely indicating the extent of use during the predetermined interval.

These and other objects and advantages will become apparent from a consideration of the following, taken in conjunction with the drawings, wherein:

FIG. 1 is a perspective view of a unit incorporating the system and principles of the present invention;

FIG. 2 is a plan view of an identification card suitable for use in cooperation with the unit of FIG. 1;

FIG. 3 is a diagrammatic and vertical sectional view taken through the structure of FIG. 1;

FIG. 4 is a schematic and perspective view of a component part of the system of FIG. 1;

FIG. 5 is a diagrammatic representation of the electrical system of the structure of FIG. 1;

FIG. 6 is a perspective view of an alternative embodiment of the present invention; and FIG. 7 is a diagrammatic representation of the electrical system embodied in the structure of FIG. 6.

Referring initially to FIG. 1, a unit 12 of the present invention is shown receiving a cooperating identification card 14 for evaluation. The unit 12 indicates a date by "day" and "month" through a window 16, which in accordance with one examplary form of the structure may indicate the present day, to enforce the provision that the card 14 is permitted to be used only once per day as in the case of a pass, entry ticket or limited-use credit card.

The card 14 carries a recording medium, e.g. fine magnetic particles, on which are recorded signals indicative of the last day when the card was used. Upon placing the card 14 into the unit 12, the date recorded on the card 14 is sensed by a structure within the unit 12 to provide electrical signals which are compared with electrical signals that are registered in the unit and are indicative of the date manifest in the window 16. That comparison may indicate: (1) the card has not been used on the current day, in which event a green light 18 is illuminated; the card has been used on the current day, in which case a red light 20 is illuminated; or the comparison for one reason or another is not logical, in which event a yellow light 22 is illuminated. Note, that the current date is written in the recording space of the card only if the existing date on the card is earlier. Therefore, a card holder having free access to a unit 12, cannot defraud at the location of another unit 12 by advance dating his card to clear it.

In operation, the unit 12 records (either verifies or freshly records) signals on the card 14 indicative of the current date as shown in the window 16. Therefore, as the card is used it is automatically updated and may not be reused on any day to support the second credit extension or other permissive grant. The application for the structure of FIG. 1 are exceedingly broad and include virtually any arrangement or agreement under which limited use of an identification card is specified. For example, the structure of FIG. 1 may be effectively employed in situations wherein; an identification card owner agrees to use his card only once per day for a purchase in excess of a predetermined amount; an identification card holder agrees to use his card only once per day to gain entry to a parking lot or other closed facility; an identification card holder (as a security employee) in the proper course of conduct would appear at a particular check point only once per day. Of course, each of these examples are subject to many variations. Specifically, in this regard, the time interval may vary widely in different applications so that the terminal time indicated through the window 16 may be an hour, a part of a day, a week, a month, or so on, depending upon the particular application. Also, the manifestation, as indicated by the lights 18, 20 and 22 in FIG. 1 may take a variety of forms including mechanical control devices as well known in the prior art.

After the unit 12 has operated to sense the card 14 and has indicated a status, a reset button 24 will normally be depressed to prepare the unit for another operation. Thereafter, the on-off switch 26 may be used to deenergize the unit, pending another operation.

As indicated above, the identification device or card may take a wide variety of different forms and the card 14 (FIG. 2) is merely illustrative. The card 14 comprises laminated embossed plastic material having a strip 28 of magnetic recording medium, e.g. fine iron oxide particles, sandwiched between plastic laminations. Specifically, as shown in FIG. 2, an upper lamination 30 is bonded to a lower lamination 32 with the strip 28 therebetween. The upper section 34 of the card receives embossed letters identifying the owner by name, address, and account number. The card may also be embossed with a code letter 36 and a year number 38.

The information recorded in the strip 28 is not humanly perceivable and if desired the strip can be concealed by making the laminations 30 and 32 opaque. However, the strip 28 is shown in phantom in FIG. 2, to include two serial channels 40 and 42 for recording binary digits. The channel 42 may be termed a clock channel and has regularly spaced permanently recorded magnetic variations 44 (indicated, though not visible) for timing and identifying the designations recorded in the channel 40. The designations 44 in the channel 42 are 10 in number and may be sensed by a magnetic transducer to provide ten impulses, spaced apart to establish time positions for a scale-of-10 serial binary code.

The actual binary code information signals are provided by sequentially sensing the areas 45 of the channel 40 simultaneously with the sensing of the channel 42. It is noteworthy however, that the art of data recording is quite advanced with the result that many techniques have been developed. The use of a clock channel and a data channel is one technique; however, several alternative arrangements are widely known and used, including techniques employing a single channel as with phase-significant signals.

The operation and structure for sensing the data and clock channels 40 and 42 and utilizing such information will be considered in detail below. However, preliminarily it is to be noted that the card 14 is to be inserted on the unit 12 as indicated by an arrow 48 so that the channels will be sensed from right to left in accordance with the convention adopted herein. As a result, the areas 45 in the channel 40 indicate binary digits from right to left, of increasing significance. The discreet areas 44 provide clock pulses from the channel 42 to identify the discreet areas 45 indicative of binary digits. In this regard, a "zero" or "ready" clock pulse is also carried in the channel 42 for timing purposes.

The nine binary code digits recorded in the channel 40 indicate a date, a month and a day, i.e. for comparison with the date indicated by the internal register within the unit 12 (described below). The specific binary code for dates that is adopted herein as an illustrative example for use in the unit of FIG. 1 is set forth in the following chart:

CHART 01

| | TIME SIGNAL CODE | | | |
|---|---|---|---|---|
| | D9 | D8 | D7 | D6 |
| JANUARY | 0 | 0 | 0 | 1 |
| FEBRUARY | 0 | 0 | 1 | 0 |
| MARCH | 0 | 0 | 1 | 1 |
| APRIL | 0 | 1 | 0 | 0 |
| MAY | 0 | 1 | 0 | 1 |
| JUNE | 0 | 1 | 1 | 0 |
| JULY | 0 | 1 | 1 | 1 |

CHART 01 – Continued

| | | | | |
|---|---|---|---|---|
| AUGUST | 1 | 0 | 0 | 0 |
| SEPTEMBER | 1 | 0 | 0 | 1 |
| OCTOBER | 1 | 0 | 1 | 0 |
| NOVEMBER | 1 | 0 | 1 | 1 |
| DECEMBER | 1 | 1 | 0 | 0 |

| | D5 | D4 | D3 | D2 | D1 |
|---|---|---|---|---|---|
| 1  | 0 | 0 | 0 | 0 | 1 |
| 2  | 0 | 0 | 0 | 1 | 0 |
| 3  | 0 | 0 | 0 | 1 | 1 |
| 4  | 0 | 0 | 1 | 0 | 0 |
| 5  | 0 | 0 | 1 | 0 | 1 |
| 6  | 0 | 0 | 1 | 1 | 0 |
| 7  | 0 | 0 | 1 | 1 | 1 |
| 8  | 0 | 1 | 0 | 0 | 0 |
| 9  | 0 | 1 | 0 | 0 | 1 |
| 10 | 0 | 1 | 0 | 1 | 0 |
| 11 | 0 | 1 | 0 | 1 | 1 |
| 12 | 0 | 1 | 1 | 0 | 0 |
| 13 | 0 | 1 | 1 | 0 | 1 |
| 14 | 0 | 1 | 1 | 1 | 0 |
| 15 | 0 | 1 | 1 | 1 | 1 |
| 16 | 1 | 0 | 0 | 0 | 0 |
| 17 | 1 | 0 | 0 | 0 | 1 |
| 18 | 1 | 0 | 0 | 1 | 0 |
| 19 | 1 | 0 | 0 | 1 | 1 |
| 20 | 1 | 0 | 1 | 0 | 0 |
| 21 | 1 | 0 | 1 | 0 | 1 |
| 22 | 1 | 0 | 1 | 1 | 0 |
| 23 | 1 | 0 | 1 | 1 | 1 |
| 24 | 1 | 1 | 0 | 0 | 0 |
| 25 | 1 | 1 | 0 | 0 | 1 |
| 26 | 1 | 1 | 0 | 1 | 0 |
| 27 | 1 | 1 | 0 | 1 | 1 |
| 28 | 1 | 1 | 1 | 0 | 0 |
| 29 | 1 | 1 | 1 | 0 | 1 |
| 30 | 1 | 1 | 1 | 1 | 0 |
| 31 | 1 | 1 | 1 | 1 | 1 |

The structure for sensing code signals from the magnetic strip 28 is shown in FIG. 3, indicating a partly diagrammatic sectional view through the unit 12. The card 14 is placed into the unit 12 through an entry port 50 to be received on a rotary belt 52 for movement through the unit to an exit port 54. The belt 52 may comprise any of a variety of endless flexible forms and is held extended between a drive roller 56 and an idler roller 58 fixed at opposite ends of the unit. The drive roller 56 is mechanically coupled to be revolved by a motor 60 which moves the belt 52 at a substantially constant speed, e.g. five inches per second across a support table 62.

As a card is carried across the table 62 it is held down by a series of rollers. Specifically, a first roller 64 is rotatably mounted above the roller 56 to engage the card 14 upon entry and hold the card in firm engagement with the belt 52. Spaced apart along the belt 52, rollers 66, 68, and 70 perform a function similar to that of the roller 64.

Upon passing between the rollers 56 and 64, the card 14 engages a microswitch 72 which is connected between a source of potential (applied to a terminal 74) and an output terminal 76. The signal appearing at the terminal 76 is termed M1 herein and is used as a timing signal. In this regard, a number of timing and operation signals are developed and utilized in the examplary structure which will be introduced and explained below; however, for convenience these signals are set forth here as a glossary.

CHART 02

SIGNAL IDENTIFICATION

TIME CODE SIGNALS (see chart 01)

| | |
|---|---|
| D1 | First Digit, Day |
| D2 | Second Digit, Day |
| D3 | Third Digit, Day |
| D4 | Fourth Digit, Day |
| D5 | Fifth Digit, Day |
| D6 | First Digit, Month |

CHART 02—Continued

| | |
|---|---|
| D7 | Second Digit, Month |
| D8 | Third Digit, Month |
| D9 | Fourth Digit, Month |
| D | Generic designation for signals D1-D9—unit registered |
| R1-R9 | Card-registered signals (Code—See chart 01) |
| R | Generic designation for signals R1-R9 |

Note: In the second embodiment the code signals D1-D5 and R1-R5 represent a dollar value rather than a day of the month.

OPERATION SIGNALS

| | |
|---|---|
| M1 | Microswitch signal (first card position) |
| M2 | Microswitch signal (second card position) |
| M3 | Microswitch signal (third card position) |
| C | Clock signal (read section—phase 1) |
| C1 | Clock signal (record section—phase 2) |
| SΦ-S9 | Card position signals (clocked) |
| P1 | Phase one-operation signal |
| P2 | Phase two-operation signal |
| P3 | Phase three-operation signal |
| GR | Green light signal-approved |
| RD | Red light signal-disapproved |
| Y | Yellow light signal-improper |
| ' | Indicates binary negation of a signal |
| RS | Reset signal (manual) |
| L | Preliminary disapproval signal |
| NG | "no go" signal indicates unauthorized situation |
| V | Valid timing for card use |
| I | Difference exists between time on card and in register. |

Considering the motion of the card 14 through the unit 12 (FIG. 3) after the leading edge of the card activates the microswitch 72, the card moves under side-by-side magnetic reading heads 78 and 80 which sense the channels 40 and 42 of the card respectively. The heads 78 and 80 are shown diagrammatically and are understood to be aligned in spaced-apart relationship. The read head 80, sensing the clock channel 42 provides a uniform series of pulses which are termed clock pulses C. The head 78 sensing the channel 40 provides binary code pulses R representative of binary digits (from least significant to most significant) as characterized by the code set forth in chart 02 above and identified as digits R1 through R9

Continued movement of the card 14 through the unit 12 brings the leading edge of the card into contact with a microswitch 82 to actuate the microswitch forming a signal M2 high at a terminal 84 by closing the switch to a source of potential indicated to be applied at the terminal 86. Next, the card 14 moves under a magnetic recording head 88 and reading head 89 which cooperate with the electrical system to update the signals recorded in channel 40. Thereafter, the card 14 closes a microswitch 90 which forms a signal M3 high at a terminal 92 providing the signal from a source of positive potential applied at the terminal 94.

In the operation of the system, the time or date recorded on the card 14 (represented by signals R1-R9) is compared in an electrical system 96 with the time or date registered in the time register 98 (represented by signals D1-D9) to formulate control signals which are manifest by the colored lights as previously described. The electrical system 96 and the motor 60 are controlled by an on-off switch 26 (FIG. 1) so that the system may be deenergized during intervals when not in use. However, when energized, the system is in a standby state, ready to accept a card 14 and operate in cooperation therewith.

As indicated, a time interval (specifying an instant of termination) is registered within the unit 12. Specifically, the register as shown in FIG. 4 may be manually set to display a date and also control two sets of switches to provide electrical binary signals indicative of that date. Considering the structure, the months of the year are indicated about the periphery of a drum 100 while the days of the month are similarly visually displayed about the periphery of a drum 102. The drums 100 and 102 are mounted for independent rotation and include indexing ratchets 103 and 105 respectively, so as to be settable to indicate any date of the year. In this example a new card is to be issued each year; however, clearly the system could be extended to encompass many years.

The drum 100 is carried on a rotary shaft 104 which also carries a signal drum 106 from which actuating pins 108 extend radially to control switches 110 in accordance with the angular position of the drum 106. Therefore, when the drum 100 is positioned to indicate a particular month through the window 16 (FIG. 1) the attached drum 106 (FIG. 4) is positioned to close certain of the switches 110 to provide binary digits D6 through D9 at terminals 11 which are indicative of the selected month. In accordance with the illustrative code adopted herein, as may be seen from the above charts, when the window 16 reveals the month of "May" the code 0101 is provided at the terminals 111.

In a somewhat similar manner, the drum 102 is carried on a shaft 112 which rotatably supports a signal drum 114 having switch-closing radially extending pins 116. The pins 116 variously engage the switches 118, depending on the angular offset of the drum 114, to provide binary signals D1-D5 at terminals 120 which manifest the indicated day of the month in accordance with the code set forth above. Specifically, for example, when the drum 102 is set to indicate the "22" day of the month, the terminals 120 provide a binary code 10110. Therefore, the terminals 111 and 120 provide nine binary parallel signals D1-D9, indicative of the date registered in the unit 12 which are to be serially compared with the binary signals R1-R9 registered on the card being presented.

The internal operating system of the illustrative unit 12 is further defined by the structure represented in FIG. 5 which essentially comprises the electrical system. However, prior to considering FIG. 5 in detail, reference will be made to FIG. 3 for a preliminary functional consideration of the operation. The card 14 first passes under heads 78 and 80 during which the clock channel 42 and the information channel 40 are read by the heads. The signal content of the information channel 40 (individual card subjects data) is then compared with the reference data from the register 98. This operation occurs during phase one, designated P1. Next, during phase two (designated P2) the card passes under the heads 88 and 89 and normally the information channel 40 is updated with the signals from the register 98. In the third phase of operation P3, the card clears the unit and the results of the comparison are provided by the selective illumination of one of the signal lights.

Now, considering the system of FIG. 5, for accomplishing these operations, a timing system 124 (upper right) receives the timing signals M1, M2, and M3 and clock signals C and C1 to provide three distinct phase signals P1, P2 and P3 which indicate three sequential time phases of operation of the unit. The negation signals p1', p2', and P3 are also developed in the timing system. As well known in the prior art, the negation of a signal may be formed by a conventional inverter which reverses the state of a received two-state signal as widely used in the binary logic systems. In accordance with the convention hereof the negation of a signal is represented by the signal designation followed by a symbol "'" thereafter In addition to developing the phase signals, the timing system 124 also provides sequence signals S1 through S9 which are time indicative of the digit positions metered by the clock channel 42 on the card. That is, the signals S1 through S9 specify access time to the digit positions of the card channel 40, from least significant to most significant.

The specific structure of the timing circuit 124 includes a delay circuit 126 which receives the signal M1 and after a brief interval sets a flip-flop 128 indicating the card is in a position to be sensed. The flip-flop circuits employed herein may comprise any of a variety of bistable devices having a "set state" in which the positive output to one conductor e.g. conductor 130) is high and the negative output is low, or a "reset" state in which the reverse is true so that the binary signal in the conductor 130 is low. The set state of the flip-flop 128 manifests the first phase P1, during which the signal P1 is high and during which magnetic signals are sensed from the identification card.

During the first phase of operation, the high signal P1 appears at a terminal 132 and is applied through an OR gate 134 to an AND gate 136. The gates 134 and 136 may take any of a wide variety of forms as well known in the prior art to accomplish the logic operations thereof on applied binary signals.

During the first phases, the set state of the flip-flop 128, providing the signal P1 high, qualifies the AND gate 136 to pass clock pulses C to a scale-of-10 ring counter 140 (applied through OR gate 131). The counter 140 may take a variety of different forms as well known and readily available in the prior art, and has ten output conductors 142 one of which exclusively provides a high signal to indicate the current state of the counter. In accordance with the operation of such counters, each pulse applied (as from the gate 136) advances the state of the counter so that the single high-state binary signal progresses to the next conductor 142 in sequence. The counter is reset by application of a reset signal to a terminal 133, as described below.

The first conductor 142 from the counter 140 carries a signal S which manifests the reset or quiescent state of the counter 140. The conductors 142 in sequence then carry the signals S1 through S9 which are applied out of the timing circuit 124 to a series of AND gates A1 through A9. In this manner, these gates are qualified by the series of sequential signals S1 through S9 in synchronism with the sensing of the digit positions in clock channel 42 of the card 14. Specifically, for example, the gate A1 is qualified by signal S1 during the sensing of the first digit position (least significant) in the channel 42. The gates A2 through A9 are thereafter qualified in sequence by the signals S2 through S9 in timed relationship to the signals R1–R9.

The gates A1 though A9 also receive input signals D1 through D9 respectively which are the signals sensed from the switches 110, and 118 (FIG. 4) indicative of the time set in the register 98. Therefore, the gates A1 through A9 serialize the parallel time signals by their sequential qualification to pass the signals D1 through D9 in time sequence through an OR gate 146 to a conductor 148.

During the first phase, signals D1 through D9 are applied through an AND gate 150 (qualified by the signal P1) to an AND gate 152 and to an inverter 154. The gate 152 also receives the clock signals C and the card-recorded signal R1'–R9, sensed from sequential digit positions in the channel 40. That is, the signals R' are negation signals provided from the read head 78 scanning the channel 40 of the card. Thus, the gate 152 receives the signals R' (in sequence) which comprise the negation of the date signals sensed from the channel 40 (subject signals) for comparison with the date signals D registered in the unit 12, which may be termed the reference signals.

In the development of the signals R' by a sensing circuit 151, the subjects signals R are sensed by the head 78, from the card channel 40 as signals termed TR, concurrently with the sensing of the clock signals C by the head 80 from the clock channel 42 of the card. The signals TR from the head 80 are applied to an AND gate 154 along with the output from the head 80, comprising the clock signal C. The gate 154 is then connected to set a flip-flop 156 which is reset through an AND gate 158 that also receives the clock pulses C from the head 78 along with a train of inverted signals from the head 78 after passage through an inverter 160. Thus, when the flip-flop 156 is set, the signal R is high and when the flip-flop is reset the signal R' is high.

Recapitulating, the signal R' is formed high when a zero digit is sensed from the card; that signal is applied to the gate 152 for comparison with the true digits D from the register within the unit 12. Therefore, the qualification of the AND gate 152 occurs when the reference date signal D is "one" and the subject date signal is zero. That is, the gate 152 is qualified during a clock pulse when the registered time manifests a one digit (higher value) and the digit derived from the card indicates a zero.

A somewhat inverse operation is performed by an AND gate 162 which receives the output from the gate 150 through the inverter 154 along with the clock signals C and the date-representative digits or true signals R. The gate 162 compares the inverted reference date signals D with the true subject date-indicating signals R and is qualified when the R value is higher.

The gate 152 is connected to set the flip-flop circuit 164 while the gate 162 is connected through an OR gate 166 to reset the flip-flop 164. The flip-flop 164 is thus controlled to indicate results of the comparison between the date signals from the card and those from the internal register. This comparison may be resolved into three possibilities: (1) the subject signals R from the card indicate a date or time coincident with the date or time indicated by the reference signals D from the internal register; (2) the subject signals R indicate a date later than the reference signals D; or (3) the subject signals R indicate a date earlier than the reference signals D. In the operation of the system as described in detail below, if the signals indicate similar dates, the indication is that the card has been presented for its single permissive use (during which use it was updated) with the result that the red light 20 (FIG. 1) is illuminated revealing that fact. Similarly, if the subject date is indicated to be later than the reference date the permissive use is indicated to have been exceeded. However, if the subject date (recorded on the card) is earlier than the reference date (registered in the machine) the card holder is indicated to be entitled to the transaction in question, with the result that the green light 18 is illuminated.

The operation of the gates 152 and 162 in conjunction with the flip-flop circuit 164 to accomplish the comparison is based on initially resetting the flip-flop 164 to indicate the nonpermissive situation occurring when the dates are equal; then applying the date-representative signals (least significant first) to control the flip-flop 164 so that it will be in a set state at the conclusion of phase 1 if the subject signals R indicate an earlier date (lower numerical value) than the reference signals D. The operation may be best pursued in detail with examplary numerical values. Assume initially that the date recorded on the card 14 is "May 22" represented by binary signals 010110110, represented as the serial signals R. Also assume that the register in the unit is set to a similar date indicating a similar binary number for the signals D.

Preliminary to the comparison, the flip-flop 164 is reset by the reset signal RS, formed either by closure of the reset switch 168 or by the occurrence of the signal M1, both of which are applied to an OR gate 170 the output of which is the reset signal RS.

Therefore, as the operation starts with the flip-flop 164 reset, the gate 152 receives the assumed values of the signals D and R' in the sequence of the signals S1 through S9 as follows:

|      | S9 | S8 | S7 | S6 | S5 | S4 | S3 | S2 | S1 |
|------|----|----|----|----|----|----|----|----|----|
| C =  | 1  | 1  | 1  | 1  | 1  | 1  | 1  | 1  | 1  |
| D =  | 0  | 1  | 0  | 1  | 1  | 0  | 1  | 1  | 0  |
| R' = | 1  | 0  | 1  | 0  | 0  | 1  | 0  | 0  | 1  |

It is to be noted, that during each of the timing signals S1 through S9 the individual signals C, D and R' are never all high (represented by a "one") therefore, the gate 152 is never qualified and the flip-flop 164 is not set. Considering the gate 162 during the example, the signals applied thereto are as follows:

|     | S9 | S8 | S7 | S6 | S5 | S4 | S3 | S2 | S1 |
|-----|----|----|----|----|----|----|----|----|-----|
| C = | 1  | 1  | 1  | 1  | 1  | 1  | 1  | 1  | 1   |
| D' =| 1  | 0  | 1  | 0  | 0  | 1  | 0  | 0  | 1   |
| R = | 0  | 1  | 0  | 1  | 1  | 0  | 1  | 1  | 0   |

During no timing interval is the gate 162 qualified. Therefore, as the flip-flop 164 receives no input signals from either of the gates 152 or 162, it remains reset to provide a high output to conductor 172 indicating identity of comparison, and further, that the card bearer has his single permissive use of the card during the specified period.

Pursuing another illustrative example, assume the card carries a lower number (indicating an earlier date) than the internal register. Specifically, assume the internal register contains digital signals D indicative of the date "May 22" or binary 010110110 while the card bears digital signals R to represent 010010111, indicative of "Apr. 23rd." In accordance with the desired operation, as the internal register indicates a date in advance of the card, the bearer of the card is entitled to permissive use thereof. This operation may be best summarized by again tabulating the signals applied to the individual gates 152 and 162 as set forth in the following chart.

|     | S9 | S8 | S7 | S6 | S5 | S4 | S3 | S2 | S1 |
|-----|----|----|----|----|----|----|----|----|-----|
| Sequence of signals applied to Gate 152 ||||||||||
| D = | 0  | 1  | 0  | 1  | 1  | 0  | 1  | 1  | 0   |
| R' =| 1  | 0  | 1  | 1  | 0  | 1  | 0  | 0  | 0   |
| C = | 1  | 1  | 1  | 1  | 1  | 1  | 1  | 1  | 1   |
| Sequence of signals applied to Gate 162 ||||||||||
| D' =| 1  | 0  | 1  | 0  | 0  | 1  | 0  | 0  | 1   |
| R = | 0  | 1  | 0  | 0  | 1  | 0  | 1  | 1  | 1   |
| C = | 1  | 1  | 1  | 1  | 1  | 1  | 1  | 1  | 1   |

It can be seen from the tabulation that during the application of these signals in a time sequence from right to left, the gate 162 is qualified during the period of the signal S1, then subsequently the gate 152 is qualified during the period of the signal S6. The qualification of the gate 162 assures the reset state of the flip-flop 164; however, the later qualification of the gate 152 sets the flip-flop, providing an output to the conductor 174 to indicate the status of the presented card entitles the bearer to his permissive transaction. Summarizing the example, as the two sets of digits are compared in an order from least significant to most significant, the final state of the flip-flop 164 at the expiration of the first phase of operation will be determined by the most significant digit of difference. Therefore, the flip-flop 164 indicates the greater value by its state at the conclusion of the first phase. As demonstrated in the examplary situations, if the internal register indicates a later date than the card, the flip-flop 164 is set to manifest permissive use; however, if the card indicates the same date, or a date in advance of the internal register, the flip-flop remains reset or is reset, manifesting the card has been used and updated on the specified date.

When the first phase of operation, as described above, is terminated by the card moving to actuate the microswitch 82 (FIG. 3) the signal M2 becomes high and resets the flip-flop 128 (FIG. 5) while setting a flip-flop 176. The set state of the flip-flop 176 provides a high signal P2 at the terminal 178 to indicate the duration of the second phase.

The signal P2 is applied to a pair of AND gates 182 and 184 (lower right) which are also connected to receive the outputs from the flip-flop 164 carried in the conductors 172 and 174. The occurrence of a high output in the conductor 172, indicating the flip-flop 164 is reset, results in the qualification of the gate 184 to set a flip-flop 186 providing a "no-go" signal NG high. Recapitulating, the reset state of the flip-flop 164 indicates the presented card is not eligible for permissive use. That state is communicated through the conductor 172 in the gate 184 to set the flip-flop 186 providing the reject signal NG high. Conversely, qualification of the gate 182 by the set state of the flip-flop 164 resets the flip-flop 186 providing the negation signal NG' high, indicating that the proposed use of the card should be permitted. The utilization of the signals NG and NG' to control the selective illumination of the lights 18, 20 and 22 during phase 3 of the operation will be considered below; however, during the second phase of operation the "-time" recorded on the card is up-dated as will now be described in detail.

Referring to FIG. 3, it is to be noted that second phase starts with the closure of the microswitch 82. At that instant, the data channel 40 of the card is about to move under the write or record head 88 while the clock channel 42 of the card moves under the read head 89. These heads are shown in FIG. 5 wherein the output of the clock head 89 is shown as a signal C1 which is applied to an AND gate 190. The AND gate 190 is also qualified by a signal P2 indicating the second phase of operation, and by the signal NG' which indicates that the card carried a prior date and requires updating. That is, if the signal NG' is not high, the card was previously indicated to be ineligible for use with the result that the date recorded on the card is at least as late as the internally recorded date of the unit.

The gate 190 receives D signals indicative of the current date through the conductor 148 in sequential form from the OR gate 146 as previously explained, however, in this phase driven by the clock signal C1. That is, the ring counter 140 operates during both phases P1 and P2 stepped respectively by the clock signals C and C1 because the gate 136 (through which the ring counter 140 is stepped) is qualified during both the first and the second phases to pass the clock pulses C and C1. Therefore, the gates A1 through A9 are again qualified in sequence by the signals S1 through S9, to supply the internally registered value signals D in a serial binary form through the conductor 148 to the gate 190. Therefore if updating is required, the gate 190 supplies the binary signals D through a recording amplifier 192 to the recording head 88. The amplifier 192 is connected to the record head 88 as well known in the prior art by a conductor or a cable 198, whereupon the record head either erases or writes in the channel 40 to accomplish a desired binary signal therein in accordance with the signals D. During such recording, "zeros" are accomplished by an inverter 194 sensing the zero state to qualify an AND gate 196 along with the signals C1 and NG', to provide a signal that will erase any existing record in the channel 40.

Summarizing the operation as described above, the system accomplishes a comparison during the first phase of operation to place the flip-flop 164 in a state indicative either of authorized use of the card or unauthorized use of the card. During the second phase, the state of the flip-flop 164 is passed on to the flip-flop 186 and additionally the card is updated to the current date providing the date borne on the card is earlier. The second phase is then terminated by the occurrence of the signal M3 which is applied to reset the flip-flop 176 in the timing circuit 124, thereby providing both the flip-flops 176 and 128 reset, which concurrent states are sensed by an AND gate 198 providing a signal P3 high indicative of the third phase.

The signal P3 is applied from the gate 198 to an AND gate 200 which is qualified by the signal S9 of the ring counter 140 indicating its final state prior to reset. Qualification of the gate 200 in turn qualifies AND gates 202 and 204 which are coupled to the outputs of the "no-go" flip-flop 186. Specifically, the signal NG is applied to the gate 204 while the signal NG' is applied to the gate 202. Therefore, if the signal NG' is high (indicating permissive use) the gate 202 is qualified to set a flip-flop 206 whereby an output signal GR is formed to illuminate the green lamp 18. If, conversely, the output from the flip-flop 186 is high, providing the signal NG high, the gate 204 is qualified setting a flip-flop 208 with the result that the red lamp 20 is energized by a signal RD. As a third possibility, the timing track of the card may have been altered or misaligned, either intentionally or accidentally with the result that the signal S9 will not be established at the conclusion of the second phase of operation, so that the gate 200 will not be qualified, nor will the gates 202 nor 204. Thereupon, the flip-flops 206 and 208 remain reset, providing signals GR' and RD' high to qualify an AND gate 210 to thereby energize a lamp 22 with a signal Y indicating yellow or questionable operation. In this regard, the quiescent state of the counter 140 provides signal S and is accomplished by reset. Thereafter, the proper nine clock pulses will step the counter to provide the signal S9.

It may therefore be seen, that by the simple operation of passing the card 14 through the unit 12, an indication is provided as to whether or not the bearer of the card is presently eligible to partake of the benefits of the card. For example the bearer of the card might be a security employee at a facility with many entrance gates. In such a situation the danger exists that an employee will enter through one gate, then in some manner or another convey his card to another person who uses it to enter at a second gate. The system as described would immediately detect such an operation by illuminating the red lamp to indicate that the card had already been used in the authorized manner for the specified day, e.g. to enter the facility on a given day.

It is to be emphasized, that the system may be used in plurality at a large number of remote stations or control points without interconnecting communication links. Essentially, each card carries pertinent data thereon, avoiding the need for complex communications systems, addressing units, or central computers.

In another examplary application of the system of FIG. 1 identification cards may be issued, say for use by a service station chain, e.g. a retail automotive service company. Each of the service stations operated by the company would be provided with the system as shown and described. In the arrangement between the company and the customers, it would be stipulated that customers would only make one credit purchase per day. of course, this arrangement can be widely varied depending upon the organization of the system, as readily apparent to one skilled in the art. However, in the normal use of a credit card one purchase per day is adequate; however, if the card is lost or stolen and falls into the hands of a fraudulent user, it will normally be used more than once per day. The system hereof will detect such use for action in accordance with company policy.

In another embodiment of the system as shown in FIG. 1 the internal register may register signals indicative of a month. The stipulation between customer and sales company may then provide that only one purchase in excess of a certain dollar value would be permitted during any particular month. In the example of an automotive service company the dollar amount might be set at a level to enable unlimited gasoline purchases; however, only a single purchase of tires and the like per month. This arrangement is extremely effective to police fraudulent use of misplaced or stolen credit cards or identification cards which use normally involves several large purchases over a short interval of time.

In certain instances it may be desirable to provide a more precise control arrangement. For example, it may be desireable to facilitate an arrangement whereby a customer is authorized to purchase a predetermined dollar value of goods and services over a specified period. For example during any given month, a consumer would have credit to a predetermined amount, e.g. $100.00, usable at any of a number of establishments individually or collectively. Various previously proposed systems of the prior art utilizing a central computer could possibly accomplish such an arrangement; however, the cost of installing and operating such a system would be prohibitive. Yet, an embodiment of the present invention may be employed relatively economically to effectively control and supervise this arrangement. The embodiment satisfactory for use in this application will now be considered in detail.

The card 14 as previously described will continue as the example illustrative for use in the alternative embodiment. The various indicia and recording medium on the card is unchanged; however, the recorded letter 36 now has particular significance. Specifically, the letter 36 indicates the extent of credit to which the owner of the card is entitled during the specified period. In order to provide concrete examples, assume that the period of control is 1 month and that the letter 36 has the following significance.

| Letter | Meaning of Letter |
|---|---|
| A | Card owner entitled to $40.00 credit per month |
| B | Card owner entitled to $80.00 credit per month |
| C | Card owner entitled to $160.00 credit per month |
| D | Card owner entitled to $320.00 credit per month |

Accepting these arbitrary examplary limits, in the example, the owner of a card bearing the letter A would be entitled to total credit purchases up to an aggregate amount of $40.00 per month at any of a plurality of stores or stations. Similarly, as set out, increased amounts would be permitted the owners of cards having letter designations B, C and D. The second illustrative unit is shown in FIG. 6, and in the use thereof, the attendant or sales person again simply inserts the card 14 in the unit 220 just as previously described, and depresses one of the buttons 212 to indicate the letter on the card. The system then senses the card to determine: the month when the card was last used and the amount of credit purchases consummated during that month. If the card registers no credit purchases during the current month, and the contemplated transaction is within the limit, approval is manifest. However, if credit purchases have been made in the instant month, they are totalled with the amount of the proposed purchase, and approval is indicated only if the limit is not exceeded.

Considering the system in greater detail, a dial 226 is provided in the unit 220 to indicate the amount of the contemplated purchase in a window 225 as shown which also reveals the month on a dial 227 which is similar to the month drum 100 (FIG. 4). The month dial 227 is coded in accordance with the digits D1, D2, D3 and D4 while the amount dial 226 may be of similar structure to provide signals in accordance with the following code which, it is to be noted, does not provide a zero value.

Chart 03

| Present Purchase Value | Code | | | | |
|---|---|---|---|---|---|
| | D9 | D8 | D7 | D6 | D5 |
| $10.00 | 0 | 0 | 0 | 0 | 1 |
| 20.00 | 0 | 0 | 0 | 1 | 0 |
| 30.00 | 0 | 0 | 0 | 1 | 1 |
| 40.00 | 0 | 0 | 1 | 0 | 0 |
| 50.00 | 0 | 0 | 1 | 0 | 1 |
| 60.00 | 0 | 0 | 1 | 1 | 0 |
| 70.00 | 0 | 0 | 1 | 1 | 1 |
| 80.00 | 0 | 1 | 0 | 0 | 0 |
| 90.00 | 0 | 1 | 0 | 0 | 1 |
| 100.00 | 0 | 1 | 0 | 1 | 0 |
| 110.00 | 0 | 1 | 0 | 1 | 1 |
| 120.00 | 0 | 1 | 1 | 0 | 0 |
| 130.00 | 0 | 1 | 1 | 0 | 1 |
| 140.00 | 0 | 1 | 1 | 1 | 0 |
| 150.00 | 0 | 1 | 1 | 1 | 1 |
| 160.00 | 1 | 0 | 0 | 0 | 0 |
| 170.00 | 1 | 0 | 0 | 0 | 1 |
| 180.00 | 1 | 0 | 0 | 1 | 0 |
| 190.00 | 1 | 0 | 0 | 1 | 1 |
| 200.00 | 1 | 0 | 1 | 0 | 0 |
| 210.00 | 1 | 0 | 1 | 0 | 1 |
| 220.00 | 1 | 0 | 1 | 1 | 0 |
| 230.00 | 1 | 0 | 1 | 1 | 1 |
| 240.00 | 1 | 1 | 0 | 0 | 0 |
| 250.00 | 1 | 1 | 0 | 0 | 1 |
| 260.00 | 1 | 1 | 0 | 1 | 0 |
| 270.00 | 1 | 1 | 0 | 1 | 1 |

CHART 03—Continued

| | | | | | |
|---|---|---|---|---|---|
| 280.00 | 1 | 1 | 1 | 0 | 0 |
| 290.00 | 1 | 1 | 1 | 0 | 1 |
| 300.00 | 1 | 1 | 1 | 1 | 0 |
| 310.00 | 1 | 1 | 1 | 1 | 1 |

It is to be noted, that the code format set forth above is applicable to individual purcheses as well as the aggregate or the total purchases as recorded by binary signals R5–R9 on the card 14.

When the operator depresses the appropriate button 212 and inserts the credit card 14 into the unit 220, it first senses the signals R1–R4 indicative of the month when the card was last used, for comparison with the signals D1–D4 in a similar code representative of the current month as indicated by the dial 227. If the card has not been used during the current month and the proposed purchase is within the limit, a green light is illuminated to indicate approval. However, if the machine senses that the card has been used during the current month as indicated by the dial 227, it adds the amount indicated on the dial 226 (representing the current transaction by signals D5–D9) to the accumulated amount of purchases previously made during the month as recorded on the card (represented by signals R5–R9). If the amount exceeds the permissive limit a red light is illuminated indicating that the purchase would exceed the limit. As still another possibility, if the machine detects a malfunction or a misrecording, a yellow light is illuminated to manifest such an occurrence.

In this manner the sales person or other person controlling the transaction is immediately informed of the status of the card-bearers account. As in the previously described embodiment, it is readily apparent that the system of FIG. 6 may be conveniently employed in multiplicity at widely remote locations to effectively manifest a current status of an account.

Considering the detailed structure of the system of FIG. 6, the electro-mechanical structure may be similar to that of the unit 12 as shown in FIG. 3. However, the electrical system is quite distinct as shown in FIG. 7, and will now be considered.

The drum switches in the embodiment of FIGS. 6 and 7 provide nine binary digits, e.g. digits D1–D4 (the current month) and digits D5–D9 (the dollar amount). These digit signals D1–D9 which may be in standard binary code are applied to a series of AND gates A1 through A9 respectively. The gates A1 through A9 also receive input signals S1 through S9 as previously described which are provided from a timing circuit 252 similar to the timing circuit 124 as described in detail with reference to FIG. 5. The timing circuit 252 receives input signals M1, M2, M3 and clock signals C and C1 and provides phase-indicating output signals P1, P2 and P3 as well as the signals S1 through S9 indicating the time sequence digits, i.e. the periods during which digits are to be sensed and recorded.

The AND gates A1 through A9 are qualified by the timing signals S1 through S9 in sequence to provide internally registered signals D1 through D4 through an OR gate 254 to a conductor 256, and signals D5 through D9 through an OR gate 258 to an AND gate 260 which also receives the first phase signal P1.

The time signal comparisons (D to R) of this system, are performed in a manner somewhat similar to that previously described with reference to FIG. 5. Specifically, the conductor 256 carries the month signals D1 through D4 to an AND gate 261 which is qualified during the first phase of operation by the signal P1. Thus, during the first phase, the signals D1 through D4 are applied to an AND gate 262 and through an inverter 264 to an AND gate 266. The AND gate 262 also receives the signals R', which are sensed from the channel 40 of the card and which indicate the binary values recorded thereon.

Specifically, the channel 40 is sensed by a head 268 to formulate the signals R and R' at terminals 269 and 271 in accordance with the adopted convention) by a sensing system 270 similar to the system 151 as described. The negation signal R' is then applied to the gate 262 (connection not shown) along with clock signals C and the true signals D1, D2, D3 and D4 which are compared with the negation signals R1', R2', R3', and R4'. As described, the presence of a "one" digit in the negation signals R' indicates a zero; therefore, if the signals D represent a month which is later (higher value) than the month represented by the signals R the gate 262 is qualified and passes a signal to set a flip-flop 272. The flip-flop 272 is reset if the reverse situation is detected by the gate 266. That is, as the gate 266 receives the negation of the signals D and the true signals R it becomes qualified by the occurrence of higher values for R indicating later months. As previously described, the most-significant digits are treated last; therefore, the final state of the flip-flop 272 indicates which of the values are higher and therefore which of the values represents a later month. As previously, the output from the gate 266 is applied to the flip-flop 272 through an OR gate 274 which also receives the reset signal RE. As a result, the flip-flop 272 is reset at the initiation of operation and continues to be reset at the conclusion of the first phase unless the card registers a month earlier in time than the internal register. In such a situation, wherein the flip-flop 272 is set, a validity signal V is established high in a conductor 276 while the negation signal V' appears in a conductor 278.

In the event of favorable dissimilarity between the signals R1, R2, R3 and R4 and the signals D1, D2, D3 and D4 it is necessary to update the record on the card. The occurrence of such dissimilarity is registered in a flip-flop 280. The flip-flop 280 is set through an OR gate 282 which receives the output from the gate 262 as well as the output from the gate 266. Therefore, the initially reset flip-flop 280 is set upon detection of any dissimilarity between the signals of concern, regardless of which signals indicate a higher value or a later month.

At the conclusion of the signal S4, the flip-flops 272 and 280 are either set or reset. Summarizing, the flip-flop 280 is reset if the reference month signals D (unit registered) and the subject month signals R (card recorded) are the same. The flip-flop 272 is set if these signals indicate the card has not been used during the current month. If the card has been used last, prior to the current month (flip-flop 272 set) it is merely necessary to assure that the current purchase does not reach the applied limit. This is done by setting a flip-flop 313 with a time selected one of the signals S5–S9, to indicate the limit of the amount of the intended transaction. Any excess is then presented by the signals D5–D9 through an OR gate 287 to qualify an AND gate 315.

The flip-flop 313 receives signals from AND gates 291, 293, 295 and 297 which are sequenced respectively by the signals S6, S7, S8 and S9. The gates 291, 293, 295 and 297 are also connected to a source of potential through individual switches 301, 303, 305 and 307 which are controlled by the buttons 212 (FIG. 6) to indicate the customers credit limit Specifically, the limits in the assumed example are:

| SWITCH | CREDIT LIMIT |
|---|---|
| 301 | $ 20.00 |
| 303 | 40.00 |
| 305 | 80.00 |
| 307 | 160.00 |

The application of the closed switch signal from the gate 289, to the flip-flop 313 sets that flip-flop when the cardholder's limit has been reached. Thereafter, the occurrence of any further signals to indicate the dollar limit has been exceeded will qualify the AND gate 315 to set a flip-flop 317 through an OR gate 319. The set state of the flip-flop 317 provides the signal NG high to indicate the transaction is not acceptable, as will be described below in detail. Of course, rather than providing the switches, a limit amount could be easily recorded on the card as readily apparent to one skilled in the art.

In addition to performing the comparison described above, the system must record the amount of the transaction for future reference. Therefore, the signals D5, D6, D7, D8 and D9 pass from the gate 301 through the gate 303 to a storage register 300. The removal of these signals (or total signals) from the register 300 for recording the card channel 40 is described below.

If the card has been used during the current month, the system must add the dollar volume of transactions for which the card has been used during the current month to the value of the proposed transaction, in order to ascertain whether or not the proposed transaction will exceed the allowed aggregate limit. This situation is manifest by a reset state for the flip-flop 280, forming the signal I' high. The negation signal I' (in conductor 286 indicating month coincidence) commands that the transactions be totalled and is applied to an AND gate 288 which also receives the signals D5, D6, D7, D8 and D9 from the AND gate 260 representing the amount of the proposed present purchase. The output of the gate 288 is applied to an adder 294. The other input to the adder, signal R (R5, R6, R7, R8 and R9) is applied through a gate 292 (clocked by signals S5-S9) and an OR gate 310. The gates 288 and 292 thus comprise the inputs to the binary adder 294 as well known in the prior art for producing "sum" signals in a conductor 296 and a "carry" signal in a conductor 298 and which is cleared by the reset signal RS.

The signals D5-D9 and R5-R9 are additively combined in the adder 294 and the sum signals are registered in a five-stage register 300 for temporary storage pending the time when the signals will be recorded on the card during the second phase of the operation. It is to be noted, that carry digits are propagated in the operation of the adder 294 as generally well known in the prior art by means of a flip-flop 302. An inverter 304, and a delay circuit 305 which is returned to the input through a clock-qualified AND gate 308 are well known in the prior art.

During the period of phase one when the sum digits are being placed in the register 300, these signals are also being tested against the authorized limit. Specifically, the "sum" output from the adder 294 is passed through conductor 296 and gate 303 to be tested against the limit signals by the AND gate 315 as previously described. If the limit is reached, the "no-go" flip-flop 317 is set.

The flip-flop 317 will also be set when the recorded card date is later than the current date, as would result from tampering. This situation is manifest by the flip-flop 272 being reset, and the flip-flop 280 being set. Thereupon, an AND gate 321 is qualified and at the time of signal S5 the gate 321 passes a signal to set the "no-go" flip-flop 317.

Summarizing, at the conclusion of the first phase of operation, the flip-flop 317 is either reset to indicate an approved transaction or set to register disapproval, i.e. "no-go." Additionally, the total purchases for the present month (including the contemplated purchases) are registered as an aggregate sum in the register 300 to be recorded in channel 40 of the card during the second phase of operation.

In the second phase of the operation, the channel 40 on the card is available to a recording head 326 for synchronized recording under control of pulses C1 from the parallel clock channel 42 sensed by a head 328.

In the recording operation, if clearance is given, an OR gate 341 (center) first passes the signals D1-D4 (representing the present month) which in turn pass through a gate 344 to a recording system 348 from which they are recorded in the channel 40. It is to be noted that "one digits" are recorded by direct application to the amplifier 348, while "zeros" are recorded by passage through an inverter 351 to an AND gate 353 (qualified by NG' and C1) to drive the amplifier 348 to erase the instant content of the channel 40.

After the month signals D1 through D4 are recorded, the digits of the register 300 are stepped out under control of the signals S5-S9, to pass through the gate 342, the conductor 340, the gate 341 and the gate 344 to drive the recording amplifier to energize the recording head 326. In this manner, the total value of purchases during the current month is recorded.

Considering the operation in greater detail, the contents of the register 300 (accumulated value) in five stages is applied to five AND gates 330, 332, 334, 336 and 338 which are qualified during the second phase of operation by the signals S5 through S9 respectively. As a result, the binary contents of the register 300 is serialized during the period of the timing pulses S5 through S9 to appear as a series of binary pulses in a conductor 340 which received the output of each of the above gates through an OR gate 342. The conductor 340 supplies the series binary signals through an OR gate 341 to a AND gate 344 which is qualified by the signal P2 indicating the second phase of operation during which recording takes place. After the card 14 has cleared the recording head 326, the second phase is terminated by the initiation of the third phase.

During the third phase of the operation, the various signals are applied to indicate whether or not the proposed transaction is authorized. If the signal NG' from the flip-flop 317 is high, indicating that the card is clear, the green light 350 is to be illuminated and if the signal NG is high the red light 352 is energized. The signals NG' and NG are applied to AND gates 354 and 356 respectively, which gates are qualified by the output from an AND gate 358, providing the timing circuit 252 stops with the signal S9 high as the third phase starts. Therefore, if the signals P3 and S9 qualify the gate 358, either: the gate 354 is qualified to set a flip-flop 360 or the gate 356 is qualified to set a flip-flop 362. These flip-flops 360 and 362 provide the signals GR and RD respectively to selectively illuminate one of the lights 350 or 352. If however, neither of the flip-flops 360 nor 362 is set, the signals GR' and RD' therefrom qualify AND gate 364 to illuminate the yellow light during the third phase of operation. Thus, the system is effective to provide a direct indication of status as a basis for action.

It is readily apparent that the present invention may be variously embodied for purposes of control in the use of identification cards as broadly defined, as well as to effectively, control action by card bearers. As suggested above, the various applications for different embodiments of this system are large in number and it is readily apparent that the criterian for the signals registered in the system may vary widely over different periods of time and for different measures of time.

What is claimed is:

1. A system for use in cooperation with an identification card bearing magnetic recording medium, comprising:
   a manually operable register, settable to manifest a predetermined time.
   switch means controlled by said register to provide binary reference signals indicative of the time registered by said register;
   means for sensing said recording medium, including at least one magnetic transducer head and means for moving said card in relation to said head to thereby provide electrical subject signals indicative of a time recorded on said recording medium;
   comparison means for determining the occurrence of said subject signals representing an earlier time than said reference signals to thereupon provide an approval signal;
   means for manifesting said approval signal;
   means for indicating a value of a current transaction as contemplated to be supported by said card; means for providing electrical signals representative of said current transaction value; means for sensing said recording medium to provide electrical signals representative of a value recorded on said card; means for accumulating said values represented by electrical signals to provide total signals; means for recording said total signals on said recording medium; and
   means for recording said electrical reference signals on said recording medium of said card.

2. A system according to claim 1 further including means for providing value limit signals representing a limit for an identification card; means for testing said total signals representing accumulated value against said value limit signals; and means for actuating said means for manifesting said approval signal under control of said means for testing.

3. A system according to claim 1 wherein said manually operable register is settable to manifest time intervals of card use as said predetermined time.

4. A system according to claim 3 further including inhibit means for inhibiting the operation of said means for recording said electrical reference signals on said recording medium of said card; and means for actuating said inhibit means under control of said comparison means.

5. A system according to claim 3 further including bypass means for inhibiting operation of said means for accumulating; and means for controlling said bypass means under control of said comparison means upon occurrence of said subject signals representing an earlier time interval than said reference signals.